(No Model.)

C. C. MERRILL.
JOINT.

No. 499,135. Patented June 6, 1893.

WITNESSES:
H. Walker
C. Sedgwick

INVENTOR
C. C. Merrill
BY
Munn & Co.
ATTORNEYS.

UNITED STATES PATENT OFFICE.

CHARLES C. MERRILL, OF RIVERSIDE, CALIFORNIA.

JOINT.

SPECIFICATION forming part of Letters Patent No. 499,135, dated June 6, 1893.

Application filed November 5, 1892. Serial No. 451,035. (No model.)

*To all whom it may concern:*

Be it known that I, CHARLES C. MERRILL, of Riverside, in the county of San Bernardino and State of California, have invented a new and Improved Joint, of which the following is a full, clear, and exact description.

The invention relates to joints for vitrified clay pipes, and similar pipes and tubes, and its object is to provide a new and improved joint which is simple and durable in construction, to permit of conveying liquids under high pressure through the pipes without danger of breaking or bursting the joint.

The invention consists of certain parts and details, and combinations of the same, as will be hereinafter described and then pointed out in the claim.

Figure 1:
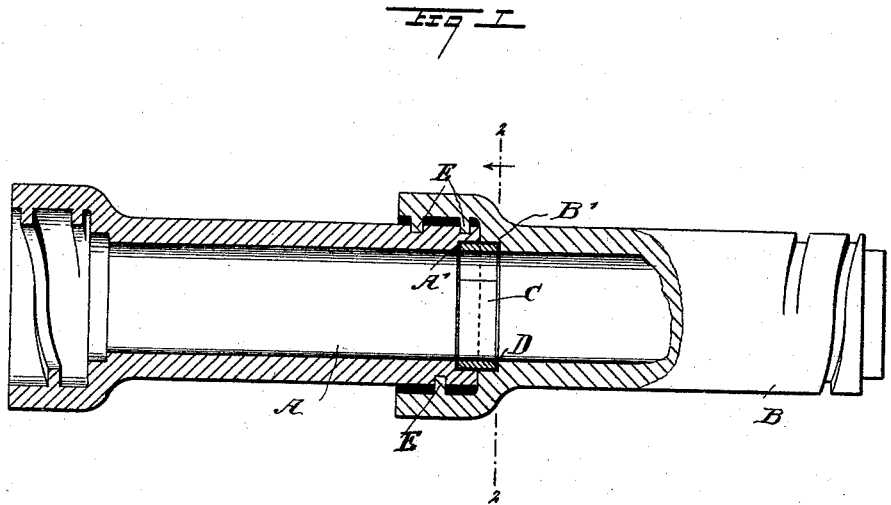
Figure 2:
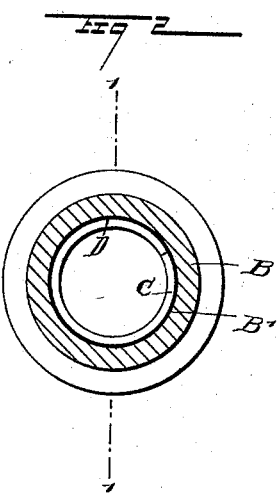

In the drawings forming part of this specification Figure 1 is a sectional side elevation of the improvement, the section being taken on line 1—1 of Fig. 2, and Fig. 2 is a transverse section on line 2—2 of Fig. 1.

The pipes A and B are formed in their ends with recesses A', B', respectively, adapted to be engaged by a band or ring C, made of metal, so as to extend about half-way into each of the said recesses, as plainly shown in Fig. 1. Before inserting such band or ring into the recesses, the latter are preferably filled with asphaltum or similar material D, so as to form a tight joint to prevent leakage, the metallic band or ring strengthening the adjacent pipe ends, so as to prevent bursting of the joint in case a liquid under heavy pressure flows through the pipe. The ring or band, C, is split, or divided transversely, and sprung into place.

The pipes are provided with sockets and in order to conveniently fasten one socket into the next following pipe end, I form in the socket, spiral ridges or threads E screwing into corresponding spiral grooves in the adjacent pipe end.

Having thus fully described my invention, I claim as new and desire to secure by Letters Patent—

A pipe joint consisting in the two pipe sections A B having a screw threaded socketed connection and annular internal recesses A' B' within the bore of the pipe sections where the ends of the sections abut and a split ring C embedded in a suitable cement within the annular recess formed by two recesses A' B' with its inner face flush with the inner surfaces of said two pipe sections.

CHARLES C. MERRILL.

Witnesses:
   EVERETT B. HOWE,
   F. B. GETINE.